(12) United States Patent
Felman

(10) Patent No.: US 11,082,463 B2
(45) Date of Patent: Aug. 3, 2021

(54) SYSTEMS AND METHODS FOR SHARING PERSONAL INFORMATION

(71) Applicant: Hillel Felman, Lake Hiawatha, NJ (US)

(72) Inventor: Hillel Felman, Lake Hiawatha, NJ (US)

( * ) Notice: Subject to any disclaimer, the term of this patent is extended or adjusted under 35 U.S.C. 154(b) by 0 days.

(21) Appl. No.: 16/231,754

(22) Filed: Dec. 24, 2018

(65) Prior Publication Data

US 2019/0199761 A1  Jun. 27, 2019

Related U.S. Application Data

(60) Provisional application No. 62/609,707, filed on Dec. 22, 2017, provisional application No. 62/670,973, filed on May 14, 2018.

(51) Int. Cl.

| | | |
|---|---|---|
| *G06F 15/16* | (2006.01) |
| *H04L 29/06* | (2006.01) |
| *H04L 29/08* | (2006.01) |
| *G06Q 50/00* | (2012.01) |
| *G06F 16/9535* | (2019.01) |
| *G06T 13/40* | (2011.01) |
| *G06F 16/9536* | (2019.01) |

(52) U.S. Cl.
CPC ........ *H04L 65/403* (2013.01); *G06F 16/9535* (2019.01); *G06F 16/9536* (2019.01); *G06Q 50/01* (2013.01); *G06T 13/40* (2013.01); *H04L 67/22* (2013.01); *H04L 67/26* (2013.01); *H04L 67/306* (2013.01)

(58) Field of Classification Search
CPC ... G06Q 50/01; G06F 16/9535; H04L 65/403; H04L 67/26
See application file for complete search history.

(56) References Cited

U.S. PATENT DOCUMENTS

| | | | | |
|---|---|---|---|---|
| 7,783,646 B2* | 8/2010 | Hamilton, II | ........... | G06T 5/008 707/751 |
| 9,507,958 B2* | 11/2016 | Uekubo | ................... | H04L 51/32 |
| 10,467,551 B2* | 11/2019 | Gayton | ................... | G01C 21/00 |
| 2004/0111360 A1* | 6/2004 | Albanese | ............... | G06Q 30/02 705/38 |
| 2007/0112762 A1* | 5/2007 | Brubaker | ............ | G06F 16/9535 |
| 2008/0086261 A1* | 4/2008 | Robinson | ................ | A63F 13/12 701/532 |
| 2008/0140640 A1* | 6/2008 | Raff | ..................... | G06F 16/9535 |
| 2009/0138276 A1* | 5/2009 | Hayashida | ........... | G06Q 50/265 705/325 |
| 2009/0150156 A1* | 6/2009 | Kennewick | ............. | G10L 15/00 704/257 |
| 2012/0079019 A1* | 3/2012 | Miettinen | ............. | H04L 67/303 709/204 |
| 2014/0034722 A1* | 2/2014 | Han | ................... | G06Q 30/0271 235/375 |

(Continued)

*Primary Examiner* — Hieu T Hoang
(74) *Attorney, Agent, or Firm* — Zeller IP Group, PLLC; Kyle M. Zeller

(57) ABSTRACT

A system and method for sharing personal information is described, wherein a server may receive and classify user information from a user. The server may further track user interactions between the user and one or more other users. The server may share certain user information classified as disclosure information with the one or more other users upon determining that a disclosure condition has been met. The server may also transmit one or more notifications relating to such disclosure.

9 Claims, 3 Drawing Sheets

(56) References Cited

U.S. PATENT DOCUMENTS

| | | | |
|---|---|---|---|
| 2014/0074824 A1* | 3/2014 | Rad | G06Q 50/01 707/722 |
| 2014/0229544 A1* | 8/2014 | Evans | G06Q 50/01 709/204 |
| 2015/0058148 A1* | 2/2015 | Grosz | G06Q 30/0269 705/26.2 |
| 2015/0186988 A1* | 7/2015 | Skinner | G06Q 30/0645 705/314 |
| 2016/0005229 A1* | 1/2016 | Lee | G06F 3/0488 345/419 |
| 2016/0277538 A1* | 9/2016 | Chow | H04L 67/36 |
| 2016/0364811 A1* | 12/2016 | Chen | G06Q 50/01 |
| 2017/0093967 A1* | 3/2017 | Grosz | H04L 67/1044 |
| 2018/0043114 A1* | 2/2018 | Bowen | A61M 15/003 |

\* cited by examiner

SYSTEMS AND METHODS FOR SHARING PERSONAL INFORMATION

CROSS-REFERENCE TO RELATED APPLICATIONS

The present application claims benefit of U.S. provisional patent application Ser. No. 62/609,707, titled "Systems and Methods for Sharing Personal Information," filed Dec. 22, 2017 and U.S. provisional patent application Ser. No. 62/670,973, titled "Systems and Methods for Sharing Personal Information," filed May 14, 2018, each of which is incorporated by reference herein in its entirety.

BACKGROUND

This specification relates generally to applications for sharing information with others. More specifically, this specification relates to applications that allow users to connect, interact and share various personal information with one another, based on customizable events and/or filters.

Self-disclosure and reciprocity are essential factors in forming relationships. When one person discloses personal information to another, the recipient is more likely to provide their own personal information in return. Indeed, studies have shown that individuals who are prone to share personal information with others during a first encounter establish long-term relationships on a more consistent basis than individuals who are more hesitant to disclose personal information.

As online interactions assume an ever-growing part of most people's daily lives, online relationships now supplement or even supplant offline relationships. According to a recent survey, forty percent of smartphone users access social networks daily, and more than half of such users believe the time they spend interacting with people through social media is as valuable as the time they spend together in person. The increasing ubiquity of online interactions is reflected by the plethora of chat forums, social networks, messaging applications, and other applications facilitating online interactions and meetings.

Unfortunately, such applications fail to model real-world interactions, where people engage in activities together, make real-time observations, and disclose personal information to one another at their own pace and according to their own comfort level. These applications either require a user to remain entirely anonymous or require users to disclose all personal information specified by the application on a one-time, upfront basis. Moreover, currently available social networking and messaging applications do not adequately assist users in avoiding befriending bad actors and often lack functionality to allow a user to build trust and rapport with other users over time.

The current inability of social networking and messaging applications to emulate real-world information disclosures and to facilitate information exchange often results in a low level of emotional connectedness among users. In one study, fifty-eight women engaged with friends through various mediums, including in-person meetings, video messaging, audio conversations, and text-only messaging. While bonding occurred across all mediums, the level of such bonding differed significantly, with the highest level of bonding occurring during in-person interactions, followed by video chat, audio chat, and lastly, text-only messaging.

Even for individuals who are eager to forge online connections with others, the process of doing so is significantly time- and energy-consuming, often requiring users to check, read and respond to multiple messages. Despite the fact that perceived similarity has proven the most significant factor in developing positive online relationships, current social networking and messaging applications fail to assist online users in discovering their similarities with other users. Moreover, current social networking and messaging applications fail to create situations that emulate real-world meetings and interactions, and fail to allow for users to gauge for social attraction, or "liking"—a significant factor in offline relationships.

Accordingly, there remains a need in the art for applications that allow users to easily disclose various personal information to others, while maintaining granular control of such disclosures. It would be beneficial if such applications allowed for personal information to be disclosed in a streamlined and automated way, based on various conditions relating to timing, similarities between users and/or interactions between users. It would be further beneficial if such applications allowed users to engage with each other in ways that strongly emulate real-world meetings and interactions.

SUMMARY

In accordance with the foregoing objectives and others, exemplary applications, methods and systems are disclosed herein for automated disclosure of personal information based on customizable rules and/or filters. Exemplary embodiments of the application may allow users to: find and interact with other users, provide information to other users via an automated information disclosure process, and/or review user information associated with such other users.

Exemplary applications may streamline the process of disclosing and/or receiving personal information to/from others. Rather than drafting messages and engaging in lengthy online conversations, users may rely on the application to automatically send/receive personal information. For example, users may customize the application to set the type(s) of information to be disclosed, users to whom such information may be provided, when (and in what order) such information should be disclosed and/or any number of conditions upon which such information should be disclosed. Accordingly, the application may allow a user to efficiently and safely establish an online or offline relationship with other users.

In one embodiment, a method for facilitating user information disclosure is provided. The method may include receiving user information relating to a first user and associating a disclosure condition with the user information. The method may also include determining that a disclosure condition has been met (e.g., when the first user interacts with a second user, when the first user is determined to be similar in some way to the second user, and/or upon expiration of a predetermined time period). Upon such determination, the user information may then be shared with the second user. The method may further include notifying the first user that the condition was met and that the user information was shared.

In another embodiment, a system is provided that includes one or more computers and one or more storage devices storing instructions that, when executed by the one or more computers, cause the one or more computers to perform operations for disclosing user information. The operations performed may include receiving user information relating to a first user and associating a disclosure condition with the user information. The operations performed may also include determining that a disclosure condition has been met and, upon such determination, sharing the disclosure information with a second user. The operations performed may further include notifying the first user and/or the second user that the condition was met and that the disclosure information was shared.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
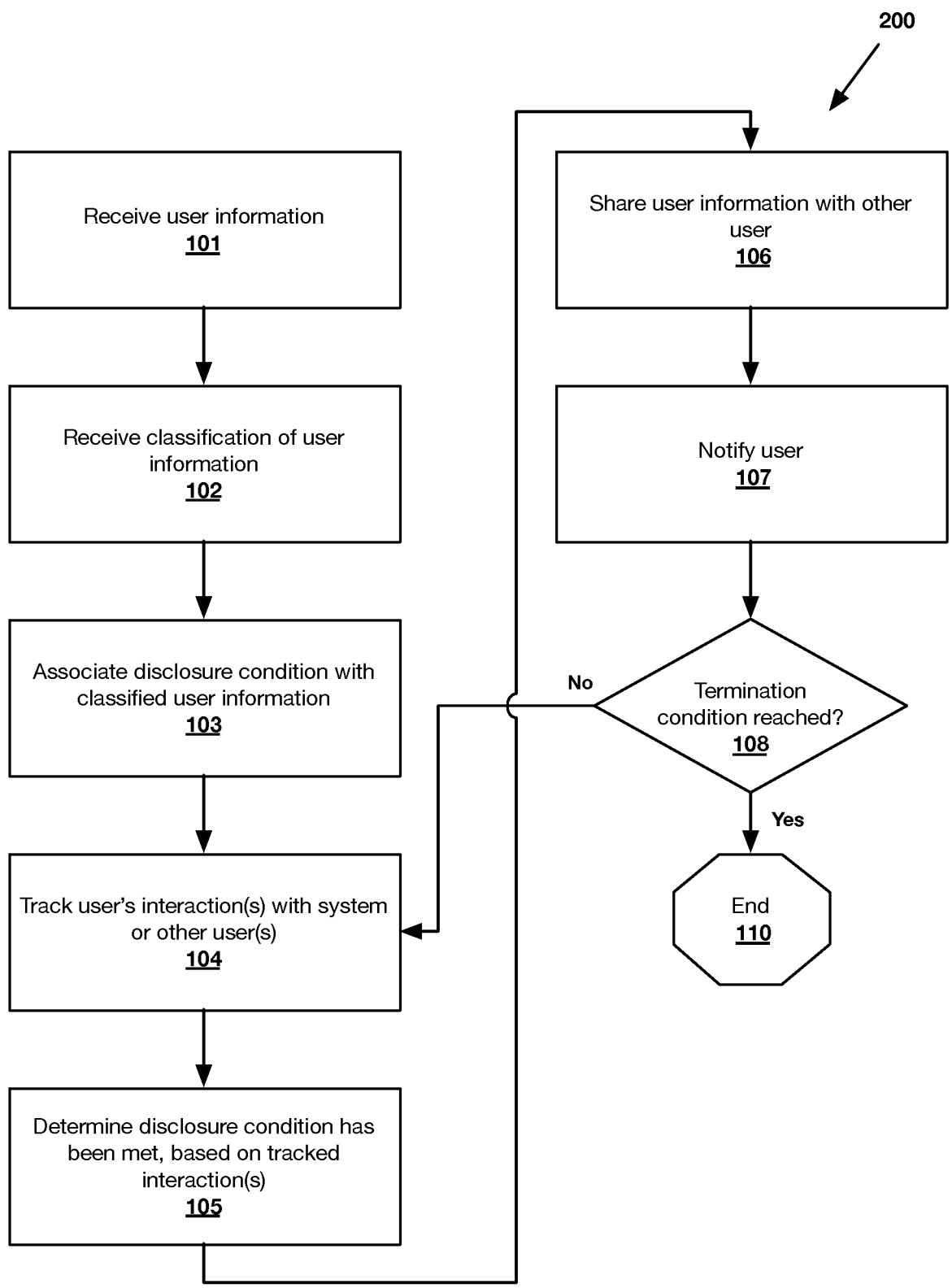
FIG. 1 shows an exemplary method 100 according to an embodiment.

Various applications, systems and methods are disclosed herein that allow users to progressively disclose their user information to one or more other users. Exemplary embodiments may receive user information relating to a user and associate the same with the user's account. The described embodiments may further allow users to search for, interact with, and/or engage in an information disclosure process with one another. Various aspects of the information disclosure process may be customizable and/or automated, such as: initiation of the disclosure process, the timing of information disclosure(s), the order of such disclosure(s), any number of disclosure conditions relating to various user information, recipients of disclosed information and/or termination of the disclosure process.

In one embodiment, the application may be a standalone application, such as a social network application. In such embodiments, the application may provide various features, including but not limited to: messaging features, searching features, subscription features, posting features, group features, polling and/or voting features, favoriting features, news and status feed features and/or others. Such features may be provided via, for example, chat forums, videos, virtual reality ("VR") programs, video games that simulate real-world interactions (e.g., buying a drink together at a bar, walking in a park, reading books in a café, etc.), audio files, articles, links, groups, automatic recommendations, etc.

In other embodiments, the application may interface with, connect to, or otherwise extend the functionality of other sites or applications. For example, embodiments of the application may interface with conventional social networking sites, such as FACEBOOK, TWITTER, or INSTAGRAM. As another example, embodiments of the application may integrate with chat forums and other commenting applications (e.g., QUORA, DISQUS, MEDIUM or REDDIT) and/or may integrate with messaging applications (e.g., FACEBOOK MESSENGER, WECHAT, WHATSAPP, GROUPME, etc.). And, as yet another example, embodiments of the application may integrate with online video game platforms (e.g., TWITCH, STEAM, etc.) to provide an information overlay user interface.

In one embodiment, a user who attempts to access an exemplary information disclosure system (e.g., via an information disclosure application) may be requested to login to an existing account or register a new account during a registration process. The registration process may request information from the user, such as a name, password, address, payment information, email address, alias, and/or other relevant information. Such information may be entered by a user or may be automatically populated from any number of connected systems. If the information disclosure system is implemented as a plugin, extension or add-on to another application (e.g., marketplace, video game platform, or social network), registration may be unnecessary due to pre-authentication and identification of the user.

In one embodiment, the information disclosure system may allow users to create multiple accounts (e.g., a primary account and any number of secondary accounts) and/or multiple identities associated with a single account. In such embodiments, the system may allow for secondary accounts to be associated with the same identity as the primary account, an identity that differs from that of the primary account, and/or no identity (i.e., anonymous secondary accounts).

As an example, a user may wish to use the application to share their thoughts on various topics with others. The user may create a primary account to share political comments with their friends on political message boards and have such comments attributed to the user's primary identity. The same user may also create a secondary account (e.g., an anonymous secondary account) to anonymously share comments on marijuana legalization. Accordingly, secondary accounts may be used for "single-blind disclosures" (i.e., where information is disclosed between one anonymous user and one identified user) and/or for "double-blind disclosures" (i.e., where two users disclose information to each other while still remaining anonymous).

It will be appreciated that the identity associated with a given secondary account may be changed, as required or desired by the user. Taking the above example, the user may change the anonymous secondary account to be associated with his true identity or even a different identity. The system may allow for such account identity associations to be manually updated and/or automatically updated based on any number of disclosure conditions (discussed in detail below). As one specific example, identity changes/updates may be based on a comment tagging system wherein the user indexes or tags comments by some qualitative aspect (e.g., on a scale of 1 to 10, controversial, personal, public, group-specific, trivial, relationship-related, career-related, family-related, etc.).

Upon creating an account (or otherwise registering), the user may sign into the application. In certain embodiments, the user may provide a username and password to login. In other embodiments, the user may employ a connected third-party authentication application to login.

Referring to FIG. 1, an exemplary information disclosure method according to an embodiment is illustrated. As shown, the method begins at step 101 where user information is received via manual entry by a user and/or automatically from a connected third-party system.

The system may employ received user information in order to create a user profile for each user of the application, where each profile comprises some or all of the user information associated with a given user. In one embodiment, a profile creation interface may be displayed to each user in order to collect user information. Such interface may comprise, for example, various forms, surveys and/or questionnaires into which a user may input and/or upload user information. The profile creation interface may be displayed to new users during the registration process and/or may be accessed by registered users via one or more links or buttons.

User information may generally comprise text, images, videos, audio files and/or combinations thereof. Exemplary user information may include, but is not limited to: identification information (e.g., name, username, password, user ID, etc.); contact information (e.g., email, mailing address, phone number, social media accounts, etc.); media (e.g., images, videos, audio files, etc.); scheduling information (e.g., scheduled and/or available times for in-person meetings, audio chats, video chat, messaging chats, etc.); billing and account information (e.g., credit card or other payment information, billing address, points or online "currency" associated with the user's account, etc.); educational information (e.g., schools attended, degree obtained, location, years of attendance, etc.); employment information (e.g., company, position, start and end dates, colleagues, skills, etc.); family information (e.g., living or deceased parents, siblings, and/or other immediate or distant relatives, etc.); demographic information (e.g., height, weight, age, gender, eye color, hair color, ethnicity, religion, etc.); location information (e.g., current location determined via real-time GPS geolocation or reverse geolocation, historical locations, birthplace, current residence, walking or traveling patterns, etc.); physiological or motor-behavior information (e.g., electroencephalogram ("EEG"), electrical potentials from electrodes; precision motion capture and/or 3D tracking systems, holographic information, digital scent information, etc.); medical information (e.g., medical history, medical conditions, medical providers, medication, etc.); social information (e.g., followed users and/or following users, friends, contacts, etc.); preferences and tastes (e.g., likes and dislikes, such as but not limited to, foods, restaurants, user experience with the application, movies, books, other media, persons, groups, places, political/moral views, or things, etc.—including any absolute scale or relativistic system for ranking such likes/dislikes); hashtags; connection preference information (e.g., characteristics desired, not desired, required or prohibited in other users, absolute or relative importance of each characteristic, relationship type desired, etc.); real-time, short-term or long-term strengths, weaknesses and goals (e.g., personal, emotional, physical, professional, etc.); activities, habits and hobbies; ratings information (e.g., ratings received from other users and/or ratings of other users); and/or settings information (e.g., notifications on/off, automatic or third-party recommendations on/off, sound on/off, allow/disallow messages from unconnected users, etc.).

It will be appreciated that user information may include social activities information, such as status updates, comments, uploads and other postings. Exemplary postings may include, for example, third-party content, user-created content, content relating to the user's real-world or virtual activity, historical content, real-time or live content, and/or any of the above content relating to groups (e.g., groups created by the user and/or groups to which the user belongs).

In one embodiment, the server may authenticate any user information (e.g., information received from a user via manual entry). Such authentication may be completed through an operating system, a network, third-party systems, and/or via trusted third parties vouching for the general accuracy of the user's information.

In one embodiment, the system may employ machine learning and/or artificial intelligence processes (e.g., image or voice recognition technology) to authenticate received user information. For example, the system may employ image recognition to verify that any uploaded images are as described by the user.

In another embodiments, authentication may additionally or alternatively be completed by another user. For example, a first user may authenticate a second user's physical appearance based on a meeting with the second user. As another example, multiple users may authenticate some or all user information relating to a given user.

It will be appreciated that users may be given the option of connecting and/or interacting only with other users whose profiles have been authenticated. This feature may involve an additional fee, or points to be paid by the user.

Additionally or alternatively, user information may be automatically determined by the system (e.g., via connection to a third-party system). For example, the system may prompt the user to login to one or more of their social media accounts so that the system may automatically retrieve user information from such accounts. As another example, the system may be connected to a government database and, upon receiving a user's name and/or address, the system may automatically retrieve additional user information from such database.

Once user information is entered into the profile creation interface and/or automatically received by the system, such information may be stored by the system (e.g., in a database). Some or all of the stored user information may also be associated with the user's profile.

At step 102, a classification of the user information is received. Generally, user information associated with a user's account may be automatically and/or manually classified as "private information" (i.e., information that is not to be shared with others); "public information" (i.e., information that is automatically shared with others); or "disclosure information" (i.e., information to be shared with other users via a disclosure processes). As discussed in detail below, disclosure information may be associated with one or more disclosure conditions such that the information may be disclosed to one or more other users during a disclosure process, upon the occurrence of the associated condition.

In certain embodiments, the system may automatically classify some or all user information associated with a user's account as private information, public information, or disclosure information. For example, the system may automatically classify the following information as private information: password, full name, billing information, blocked users, user authentication information, address, social security number, phone number, email address, messages received by the user and/or various user activities, such as user search history. As another example, the system may automatically classify some or all of the following information as public information: username, first name, age, location, followers, followed users, one or more rankings/ratings, and/or photos. The system may display the user's public user information by means of a user profile screen, which may be accessible via a URL or the like.

Additionally or alternatively, the system may allow users to manually classify user information associated with their profile. For example, in one embodiment, a classification interface may be displayed in order to allow a user to select a classification for some or all of their user information. As discussed in detail below, the classification interface may further allow users to create and/or assign various conditions (i.e., "disclosure conditions") to user information classified as disclosure information such that given disclosure information will be disclosed to one or more other users upon the occurrence of the associated disclosure condition.

At step 103, the system associates a disclosure condition with the user information classified as disclosure information. Generally, disclosure conditions may relate to a user's activity (i.e., activity-based disclosure conditions); any number of dates and/or times (i.e., time-based disclosure conditions); location(s) of the user or other users (i.e., location-based disclosure conditions); user information associated with the user and other users (i.e., user-information-based disclosure conditions); content, keywords or tags associated with the user information (i.e., content-based disclosure conditions); and/or a monetary or point value system (i.e., value-based disclosure conditions). Additionally or alternatively, disclosure conditions may relate to, or otherwise depend on, one or more other disclosure conditions.

Exemplary user-information-based disclosure conditions may relate to one or more of the following: a user being highly ranked or positively reviewed by other users; a user being highly ranked or positively reviewed by a specific type of user (e.g., by users who are themselves highly ranked or positively reviewed); a user's user information being confirmed by another trusted user and/or authenticated by the system; a user's user information matching a given criterion; and/or two users being associated with at least some similar or identical user information (e.g., a similar interest in a specific activity, overlapping scheduling availability, similar educational information, similar commenting history, a shared favorite website, similar demographic information, and/or similarly rated or ranked digital content, such as a book, movie, music, image, post and/or lists of such content). Other exemplary user-information-based disclosure conditions may relate to specific users or groups of users; a connection existing between users (e.g., two users are connected to another user); and/or a degree of connection between the user and another user.

In order to disclose without actually disclosing, or to be awarded some type of internal exchangeable credits for doing so, metadata of various sorts, such as demographic data, or degree of connection, could be disclosed. In such instances, the disclosure may occur in some cumulative, but anonymous, way.

Exemplary content-based disclosure conditions may relate to words, keywords, symbols, objects, etc. in a post or comment. Such conditions may alternatively or additionally relate to hashtags or other classifications associated with such information. In one embodiment, the system may allow for content-based disclosure conditions to relate to crowd-sourced information. For instance, a particular post or comment submitted by a user may be disclosed to one or more other users upon a crowdsourced determination (e.g., via voting or the like) that the post/comment is popular or of a high quality. To allow for crowdsourced determinations, a user who submits a post or comment may agree to manually or automatically allow the system to disclose certain specific or generic information to other users.

Exemplary time-based disclosure conditions may relate to, for example, a specific date and/or time, and/or predetermined amounts of time (e.g., after a user connects to another user or after a message is sent to/received from another user). In one embodiment, users may set a specific order of disclosure information to be disclosed, specific items of information to be disclosed, specific speeds or rates for items to be disclosed, specific dates and/or times for items to be disclosed, etc. For example, one user may choose to disclose their photo at a first time, then their first name at a second time, and finally, their location at a third time. Another user may choose to, instead, disclose their first name at a first time, then their location at a second time, and finally, their photo at a third time. In another embodiment, users may initially choose an avatar unrepresentative of their physical appearances to represent themselves to each other. Disclosure may then involve replacing parts of the avatar with a digital representation of each user's actual physical features over time.

In certain embodiments, the system may also allow users to account for order of disclosure and/or delays in information disclosure. As an example, a user may specify that, if they are the first to disclose information during an information disclosure process, then their information should be disclosed on a more conservative basis (i.e., longer delays between disclosures) than if both users were simultaneously disclosing information. As another example, a user may also specify that, if they are the second user to disclose information during an information disclosure process, then their information should be disclosed on a more liberal basis (i.e., shorter delays between disclosures) than if both users were simultaneously disclosing information. As yet another example, a user may specify that a short delay in receiving one important piece of information from another user may cause a long delay in disclosing a less important piece of the user's information to the other user. And, as another example, a user may configure the disclosure process to allow for acceleration and/or deceleration in reciprocity of another user's behavior.

Exemplary location-based disclosure conditions may relate to the current or historical location of the user and/or the current or historical location of another user. For example, a disclosure condition may be based on at least one of the users being located (or not being located) in a given area or within a predetermined distance from a given location. As another example, a disclosure condition may be based on a determination that the users are located (or are not located) within a predetermined distance of each other. As yet another example, a disclosure condition may relate to distance-based "rings" or "levels," wherein each level is defined by a range of distances from the user's current location. And, as another example, a disclosure condition may be based on both users having visited (or having not visited) a particular location at some point in the past.

As a specific example, an American college student spending a semester in Paris, France may wish to find other Americans (or, specifically, other American college students) who are currently in Paris. Accordingly, the student may create a disclosure condition to allow disclosure of their user information to other users who are American and who are located within the city of Paris. The student may additionally or alternatively limit disclosure to other such users who have the same or similar disclosure condition(s) associated with their accounts.

With respect to value-based disclosure conditions, in one embodiment, each individual information disclosure may be assigned a number of points that are awarded to the user once they disclose, and the users may trade information based on a certain number of points they are both willing to use. Points may be assigned on the basis of: order of disclosure, timing of disclosure, length of visibility of disclosure, specific information disclosed, whether disclosure is simultaneous or not, the amount of information disclosed, the sensitivity of information disclosed, the rank of a user disclosing or being disclosed information, the other user's ranking of the user disclosing information, how often in the past a specific piece of information is disclosed, whether the information disclosure is reciprocated, who initiated the disclosure process, etc. Points may also be awarded to users on the basis of various user activities, including but not limited to: authenticating another user, meeting another user, creating a profile, ranking another user, providing a recommendation, maintaining a regular presence on the application, creating a post, initiating an information disclosure process, etc.

In one embodiment, a point system may also allow two or more users to agree upon a static or dynamic fair market value for the disclosure of various types of disclosure information. For example, a current country may be worth 25 points, a current city may be worth 50 points, an immediate previous city may be worth 20 points, and a high school may be worth 22 points. In this example, users may simultaneously disclose one or more types of disclosure information having an equal or approximately equal total point value (e.g., 70 points worth of any disclosure information or from about 65 to about 75 points worth of any disclosure information). In other embodiments, however, users may reach an agreement to allow one user to disclose information of a significantly lower or significantly higher value than another user. The users and/or system may then keep track of the disclosure imbalance for future disclosures, or dismiss the imbalance.

It will be appreciated that points may be employed for any number of features in addition to information disclosure. For example, points may be used to access special features of the application, purchase items, join certain groups, participate in chat forums, access websites, read or comment on blogs, contact users, and/or to view users. As discussed above, points may be exchanged among users or may be earned by users upon engaging in various activities.

It will also be appreciated that instead of, or in addition to, utilizing a point system, other forms of bartering value or compensation may be utilized. In certain embodiments, a user may decide to forfeit one or more privileges in order to gain one or more different privileges. For example, a user may gain the privilege of being able to contact another user he normally is unable to contact in exchange for forfeiting the privilege of requiring the contacted user to disclose his identity during an information disclosure process. In another embodiment, a user may gain the privilege of following a set of relaxed disclosure conditions in return for initiating the information disclosure process with another user. In yet another embodiment, compensation in the form of actual currency may be utilized.

Activity-based disclosure conditions may generally relate to social activities associated with a user (i.e., performed by the user or performed by others in relation to the user). Such social activities may include, for example: sending/receiving comments, messages, reviews, connection requests, and/or user information to/from other users; voting on polls; posting on message boards, pages, other users' "walls" and/or other sites; connecting with other users; and/or reading, favoriting or otherwise interacting with articles and other posts associated with the user. Some specific social activity-based disclosure conditions include: the user disclosing/ receiving an amount and/or type of user information; the user disclosing/receiving a predefined number of messages; the user beginning a disclosure process with a certain number or type of other users; the user already having, or adding within a certain time frame, a certain number or type of connections; and/or the user connecting with, or interacting with, another user in a particular way.

Other activity-based disclosure conditions may relate to current or historical digital activities—whether such digital activity occurs within the system or within a connected third-party system. Exemplary digital activities may include, for example, visiting a website, watching a video, listening to a song, playing a video game on a computer or gaming console, purchasing or selling an item through an online marketplace, uploading a digital file, and/or generally using an input device to control a computer (e.g., a mouse, a keyboard, an eye-tracking sensor, a hand-gesture recognition sensor, a facial-gesture recognition sensor, a motion sensor, a body-position recognition sensor and/or an audio input device, such as a microphone).

Yet other activity-based disclosure conditions may relate to current or historical real-world activities associated with a user. Exemplary real-world activities may include, for example, consuming a particular type or amount of food or drink, visiting a given establishment, traveling to a particular location, attending an event, playing a musical instrument, exercising, reading a book and others.

In one embodiment activity-based disclosure conditions may relate to real-world or digital activities that are scheduled to occur at a future time. In such embodiment, a user may keep a schedule or calendar comprising any number of future activities, including times, locations, and/or other participants. And the system may access the schedule in order to determine and analyze activity information.

The system may automatically receive, track and/or determine some or all of the above activities by accessing sensors associated with one or more user devices employed by the user and/or information stored by such user devices. In one embodiment, the system may retrieve stored and/or real-time activity information from one or more user device sensors, including but not limited to: accelerometers, gyroscopes, global positioning system ("GPS") sensors, microphones, cameras, mouse tracking sensors or software, video or playback and/or other input devices and software. In another embodiment, the system may retrieve activity information stored by a user device, such as but not limited to: historical, current and/or scheduled physical location(s) of the user, health and exercise information, website browsing history, social media account information, etc. It will be appreciated that the system may employ machine learning and/or artificial intelligence processes (e.g., image recognition, natural language processing and/or voice recognition technology) to determine activity information and/or predict future activity information.

The system may employ the determined activity information for various purposes. In one embodiment, the system may display historical, current, and/or scheduled activity information to specific users and/or publicly to all users. Such activity information may be displayed via a public profile, notifications (e.g., based on classification and conditions), a mapping interface, a graphical widget present and/or any other disclosure interface present within the application or within a third-party application. As an example, a mapping interface may include a list of users, where information relating to each user in the user list is displayed. Such information may include an image or avatar, a username, a current virtual location of the user (e.g., a website) and/or a historical virtual location of the user (e.g., webpages the user has visited in order to arrive at their current virtual location). As another example, a graphical widget of a disclosure interface may be displayed on a particular webpage, where the widget includes a list of users who are currently viewing the webpage and information associated with such users (e.g., an avatar, a username, any disclosed user information, etc.). In both of the above examples, a user may select a user from the displayed user list to view that user's publicly available profile and/or to send a message to that user (when permitted).

In some embodiments, the system may analyze a user's activity information to discover patterns, understand various information about a relationship between two users or among multiple users (e.g., how two users first became connected, how users typically interact with each other, a "closeness" of a particular connection, etc.), and/or to determine recommendations (e.g., content recommendations or potential connections recommendations (discussed below)). The results of an analysis of a user's activity information be displayed to one or more users and/or may be used in information disclosure processes.

In one embodiment, a user may be required to grant permission before the system tracks certain activity information. Such permission may be global or may be granular such that the user may exclude certain activities (or certain types of activities) from being tracked.

In any event, the application may allow users to create any of the above-described disclosure conditions and/or may provide any number of default disclosure conditions. Accordingly, the user may select or assign such disclosure conditions to each of the disclosure information associated with their account. In one embodiment, the application may allow multiple items of disclosure information to be assigned to a single category or group such that the user may set one or more disclosure conditions for the whole group.

At step 104, the user may interact with the system and/or other users of the system. In one embodiment, the user may be required to "meet," "discover" and/or connect with other users of the system before they may interact or engage in information disclosure with such users. In certain embodiments, users may be required to connect, even if they have actually met one another in person or via a different application. In other embodiments, users may be automatically connected if they are already connected via a different application (e.g., FACEBOOK, TWITTER, TWITCH, etc.). The discovery and/or meeting of other users may be manual or automatic in nature.

In certain embodiments, a user may meet or discover other users by manual means. For example, a user may find another user by entering public information into a search interface searching for certain parameters (e.g. name, commonalities, physical characteristics, traits that one of the users does not possess but finds desirable, etc.). If the entered information matches user information associated with one or more users' accounts, a profile (i.e., a URL) associated with such users may be returned. The searching user may view the returned profiles and/or request to connect with one or more of the returned users.

Users may meet via other additional or alternative means, including but not limited to: profile browsing, introductions by a third party, participating together in an event (e.g. watching and/or reacting to videos, streaming a sports games, playing a video game, etc.), commenting on the same post, etc. As an example, a user may allow other users to view him on camera and show that he is available for interaction while the user is active on the application. As another example, the user may meet another user on a different platform with which the application is integrated, such as: social networks, multiplayer video games, VR games or events, websites, blogs, chat rooms, business forums, etc.

As discussed in detail below, each user may be associated with a particular avatar (e.g., a static or dynamic image or video) that is displayed to other users of the system. For example, a user's avatar may be associated with, and displayed alongside, interactions (e.g., comments, posts, etc.) taken by the user within the system and/or any third-party system, application or site connected to the system. Accordingly, other users of such sites (and the system) may see the user's avatar and select the same to view the user's profile and/or connect with the user.

In certain embodiments, the system may automatically display or recommend other users (i.e., potential connections) to a user based on various factors, including but not limited to: public information and/or disclosure information associated with the user's profile and the potential connections' profiles (e.g., commonalities in public information and/or disclosure between the users, a high authenticity ranking/rating of the user and/or potential connections, other user rankings/ratings, mutual connections, etc.). In some cases, the system may also display the reason(s) for each recommendation while concealing certain underlying information. It will be appreciated that such potential connections recommendations may be presented to a user and/or withheld from a user depending on both the user's disclosure preferences and the potential connection's disclosure preferences.

As an example, the system may analyze a user's search activity and compare the same to other users' search activities in order to provide one or more potential connection recommendations. Such recommendations may include information relating to the percentage of search activity overlap between the user and each potential connection and/or specific overlapping searches. As another example, the system may recommend a potential connection to a user based on the existence of one or more mutual connections between the user and the potential connection. If the mutual connections allow the system to disclose their identity (in whole or in part), the system may display the allowed information to the user upon making the recommendation.

In one embodiment, the information used in recommending potential connections may be dynamic. For example, the system may recommend users based on the fact that the two users are currently in the same physical location or virtual location (e.g., chat room, webpage, message board, video game world, VR simulation, etc.). In other embodiments, the application may include a lag time such that users are only recommended after they are no longer in each other's physical or virtual vicinity.

Recommendations may also be based on similarities in historical, current or future activities. That is, the system may recommend users based on the fact that the two users are, were, or will be engaged in the same (or a similar) activity (e.g., cooking, eating, watching particular content, listening to particular audio, visiting a specific website, etc.).

The system may additionally or alternatively provide content recommendations to users. Such content recommendations may relate to one or more of the following: websites, blogs, articles, links, videos, movies, television shows, songs, images, games, books, etc. As with potential connection recommendations, content recommendations may be based on any user information associated with a user's account and any information associated with the recommended content.

In one particular embodiment, content recommendations may be based on crowdsourced information. For example, a particular content item may be recommended upon a crowdsourced determination that the content is popular or of a high quality (e.g., via voting or the like).

In any event, once a first user has connected with a second user, the two users may interact with each other and such interactions may be tracked by the system 104. Generally, users may interact with each other according to any of the social, digital and/or real-world activities discussed above. Some examples of such activities include: following another user; joining another user's network; manually or automatically disclosing/receiving disclosure information to/from another user; calling or video chatting with another user; watching videos with another user; listening to audio with another user; browsing websites with another user; playing games with another user; viewing or reacting to another user's social activities; and/or selling/purchasing digital or physical products to/from another user.

In one embodiment, the system may provide an interface to allow users to exchange messages with one another. Such messages may comprise any format, including one or more of: text, audio, images and/or video. The form of messaging may be a messaging application provided by the system, through ordinary means of hidden email addresses (e.g., a type of mailing system within the system, a hidden address mailing, etc.). The system may provide automatic translation features to allow users to interact with each other in different languages (e.g., in real time or near real time).

It will be appreciated that, in certain embodiments, users may not exercise equal control of, nor contribute equally to, a shared experience. Rather, the shared experience may be controlled by the system, by one user, or by a percentage of users out of a group. In one such embodiment, a participant user may interact with a host user by joining the host's digital event or activity (e.g., a chat room or a video game). In this embodiment, the host user may utilize a hosting interface provided by the application to facilitate the digital activity and to allow the participant user to join the activity. The hosting interface may allow the host user to view certain aspects of the participant user's user information during the digital activity and, potentially, after the digital activity.

At step 105, the system determines that a disclosure condition associated with a user's disclosure information has been met, based on the tracked user activities and/or interactions. And at step 106, the system then shares the user's disclosure information with another user.

As discussed above, the initiation and progression of the information disclosure process may be automated, manual, or may include both manual and automatic components. In one embodiment, the application may include an information disclosure interface which is adapted to provide, transmit or otherwise display at least (1) a first user's user information to a second user and (2) the second user's user information to the first user. It will be appreciated that the information disclosure interface may allow a user to disclose their user information to a single user (e.g., on a personal, one-on-one basis) and/or to multiple users (similar to group messaging).

The information disclosure interface may be similar to (or integrated with) the above-described messaging interface, and may be a standalone application or may be integrated with other applications. Accordingly, the information disclosure interface may allow for information disclosure to take place along with other user interactions, such as the social, digital and/or real-world activities discussed above.

The information disclosure interface allows for simultaneous or sequential disclosure of user information, depending on relevant disclosure conditions. For example, in one embodiment, the disclosure interface may allow users to release the same piece(s) of disclosure information simultaneously, after a predetermined amount of time. In some embodiments, the system may request confirmation from the user in advance of any disclosures, and users may have the option of overriding previously determined settings.

The disclosure interface may be overlaid on top of another application and/or integrated into another application such that two or more users may use the disclosure interface while participating together in a real-time, digital activity, such as playing a video game, participating in a VR experience (e.g., a simulation of a real-world experience), listening to music, watching a movie or collaborating on a document. The interface may display a list of users who are currently participating in the digital activity along with any associated disclosure information that is, or that has been, disclosed according to a disclosure process.

In one embodiment, a user's disclosure information may comprise one or more avatars that may be displayed in the list of users. Such avatars may comprise, for example, a live video feed (e.g., from a user's webcam), a recorded video, a photo (e.g., a photo of the user) and/or another digital icon, figure or image. In one particular embodiment, each avatar may be representative of a respective user's physical appearance. That is, a user's avatar may comprise various features that correspond to the user's physical features, such as height, weight, hair, smell, voice, eyes, nose, chin, jaw, lips, eyebrows, forehead, cheekbones, limbs, gait and/or walk.

A user's avatar(s) may generally be shown in the list of users and/or may be incorporated into the application. For example, the avatars may be arranged in rows corresponding to the degree of connection to respective users, such as first-degree connections in a first row, second-degree connections in a second row, etc. As another example, the user avatars may be arranged in a border displayed around an application. As yet another example, the avatars may be located within a virtual environment representing a real-world place (e.g., a lounge, bleachers, a gallery, etc.) and the avatars may be adapted to dynamically mirror the respective user's real-world movements and/or facial expressions.

It will be appreciated that the particular information displayed for a certain user will depend on the user's disclosure conditions. For example, if a user's profile includes a live video feed avatar and a static image avatar, the static image avatar may be displayed before a disclosure process begins. Then, upon fulfillment of a specified disclosure condition, the static image avatar may be replaced with the live video feed avatar.

Similarly, aspects of a user's avatar may be concealed or distorted unless and until various disclosure conditions are fulfilled. That is, the various features of the avatar may be shown, hidden or otherwise manipulated, as dictated by a disclosure process. For example, the entire avatar may be replaced with an icon, blurred, cropped, filtered or otherwise hidden before a disclosure process begins. And, as the disclosure process proceeds, various features of the avatar may be shown until the entire avatar is made available.

It will be appreciated that, as a result of varying levels of disclosure and varying connections amongst the users, what a first user may view of a second avatar (and any other disclosure information) may differ from what a third user in the same group may view of the second user's avatar (and any other disclosure information). Indeed, the users displayed to the first user may also vary from the users displayed to the second user, based on the respective user's specified disclosure condition(s).

In one embodiment, the disclosure interface may allow users to record, store and share their activity with others. Based on a user's disclosure settings, such recordings may include information relating to any content consumed during a given activity, any user information disclosed by the user during the session, communications transmitted/received to/by the user during the session, engagement information, session date/time, session length, etc. In terms of matching interactional preferences, each of the following may be employed as mutual disclosure conditions: a limit on the degree of interaction set by a user (e.g., a number of characters of interaction per given time period), permission to store questions, and/or permission to record session.

In cases where an activity is associated with particular content (e.g., watching a movie) the recording may be synchronized to the content (e.g., such as in a SRT file). For example, a given recording may include video of a particular person watching a movie, wherein the video is equivalently synchronized to the movie.

The disclosure interface may provide a list of available recordings such that a user may select one or more of such recordings to display in their disclosure interface. That is, each of the recordings may serve as a track that may be viewed in the disclosure interface when a user is consuming content. In this way the interface allows a user to feel like he is watching a movie with others, even when no other users are online (i.e., a theater experience could be recreated where the screen is surrounded by other faces and their expressions as they watched).

In certain embodiments, the disclosure interface may be adapted to track, determine and/or analyze various activity information relating to interactions among users. For example, the interface may measure or determine information about a user's engagement with one or more of the displayed users (e.g., real-time users or recorded users). Such engagement information may include eye contact, facial and other micro-expressions, hand or body movements, voice volume, voice tone, attention level, emotional state, mood, physiological indicators such as heart rate, blood pressure and/or others.

The system may employ engagement information in many ways. In one embodiment, the system may notify a first user when a second user is determined to have shown an interest the first user. For example, a first user may be notified when a second user looks at their displayed profile for a certain amount of time.

In another embodiment, the system may analyze engagement information relative to a corresponding conversation between two users to determine and record important conversational events. The system may parse the content of a conversation to inform a user when they are being boring, distressing, interesting, or exciting to their conversational counterpart (e.g., in real time or near real time). Additionally or alternatively, the system may employ such information to suggest relevant follow up messages and/or to recommend additional users to one or both of the conversation participants.

In order not to be too scrutinizing and forbidding, the system may alternatively act only as a warning system or it might slightly lower its accuracy by including an artificial randomizer or estimation factor. Additionally or alternatively, the system may record direct and/or indirect and superficial, interactional events. As opposed to a conversational events, these might include, simply being at the same site at the same time, or who else was at that site at that time, or browsing together, even when no direct conversation between the parties transpired. In addition, by allowing the system to access browsing histories, as a type of metadata, it may recommend based on people sharing common sites in interest (e.g., number, duration of visit, etc.), and/or based on their actually having been at the same site at the same time, or within a certain band of time. For instance, two people could be recommended if: they watch the same news program every night even though they watch it six hours apart; they always watch highly rated events in general, or of a specific type; and/or they watch a lot of the same channel or genre. In fact, if two people agree to the conditions, the fact that you live within 100 miles, share the same demographic, and same long term or short term browsing pattern, could itself simply count as an interactional event, and could make each person pop up on the others connection management system. Once that bar has been cleared, that connection management system could also offer whatever real-time web location and/or browsing together information that the respective parties allow.

In yet another embodiment, the system may analyze engagement information relative to a shared activity. In such cases, the system may automatically suggest conversation topics that are both pertinent to any content being viewed and likely to be of mutual-interest to the users.

As discussed above, the system may allow for disclosure conditions to include certain grace conditions, or latitudes, wherein the user allows certain conditions to be violated, in exchange for other conditions being exceeded. To that end, the disclosure interface may determine whether a violation has occurred and may automatically adjust information disclosure accordingly.

In one embodiment, the information disclosure interface may allow the disclosure information of one user to be held in escrow until the other user's disclosure information is received and/or otherwise authorized for disclosure. Such escrow may require that certain conditions are met before information is disclosed to the users. Exemplary conditions may include: receiving identical information from both users, receiving sets of the same or similar information from both users, receiving information having an identical or similar aggregate point value from both users, and/or receiving information from each user that satisfies an agreed-upon barter value.

In other embodiments, nonreciprocal disclosures may be allowed. Moreover, certain embodiments of the disclosure interface may allow users to create, collaboratively revise and/or execute one or more agreements (e.g., a non-disclosure agreement) before a disclosure process begins. Such agreements may provide an added layer of protection, as the users may agree to keep any disclosed information confidential.

At optional step 107, the system notifies the user that the condition was met and that the disclosure information was shared with the other user. In embodiments where information disclosure is staggered, the system may next repeat the above steps for the other user's disclosure to the user. In certain embodiments, the above steps may occur simultaneously for the other user during the information disclosure process.

At step 108, the system determines whether a predetermined termination condition set by the system or the user has been reached. Such termination condition may include, but is not limited to: the last piece of information from both parties has been disclosed, a predetermined amount of time has passed, at least one of the users failed to disclose information within a certain amount of time, a threshold of information exchanges has been reached, at least one of the users has blocked the other user (permanently or temporarily), at least one of the users has experienced a drop in authenticity ranking/rating below a certain threshold, etc. If the termination condition has been reached, the information disclosure process may conclude automatically 110. Otherwise, the process may be repeated, and the system may continue tracking user interactions with the system and/or other users 104.

In an alternative embodiment, all or at least a part of the information disclosure process may be manual in nature. In an embodiment where the information disclosure process is initiated and progressed manually by the user, the user, instead of the system, may determine when to initiate information disclosure and may ask another user whether that other user is comfortable with sharing certain information. If the other user is not ready to share information at that point in time, they may decline the request to share information. Additionally or alternatively, the information disclosure process may be manually concluded upon a user activity, such as at least one user opting out of the process. The conclusion of the information disclosure process may also be customizable by the users.

In one embodiment, the system may allow users to operate in groups of two or more users so that users in a particular group may disclose their user information to other users or groups. In such embodiments, some or all user information associated with each user who belongs to a group may also be associated with the group (i.e., "group information"). Moreover, users associated with a group may allow other users in the group to disclose some or all of the group information. As an example, multiple users who belong to a group may each be allowed to disclose any social activities information associated with the group (e.g., realtime, posted and/or saved images, audio, video, or blurred/obstructed/partial-view video, etc.) to other users and/or groups. It will be appreciated that various users who belong to the same group may disclose differing amounts of information to one another.

In one embodiment, the system may prompt the user to write a review of another user to/from whom they have disclosed/received information. The system may prompt the user for a review after the information disclosure process has concluded, during the process, after a certain threshold of information exchanges has taken place, etc. The user may review another user based on, for example: user response time, user response rate, user trustworthiness, user friendliness, user willingness to disclose information, amount of information disclosed by the user, etc.

Both parties may have the option of only agreeing to use the review feature if it is mutual, or even if it is not. Also, such information could be gathered, aggregated and/or stored by the system, such that an overall score may be determined. It will be appreciated that review information may be considered even if two particular parties do not complete the entire disclosure process (e.g., if they do not reveal their identities and/or significant personal information to each other).

Reviews may be public, private, or selectively public. In one embodiment, the system may allow users to see each other's reviews. For example, a first user may view a second user's review upon reviewing the second user. As another example, a first user may "pay" a second user a certain number of points when the second user reviews the first user.

In one embodiment, the system may provide a contact management feature wherein a user's various connections and friendships may be automatically tracked and categorized according to connection. Such feature may allow for some or all real-world and/or digital shared interactions to be both logged and viewed for mutual reference. Insofar as this interaction data in any and all its forms can serve as a variable for an information disclosure process, it would be a form of mutual disclosure.

Figure 2:
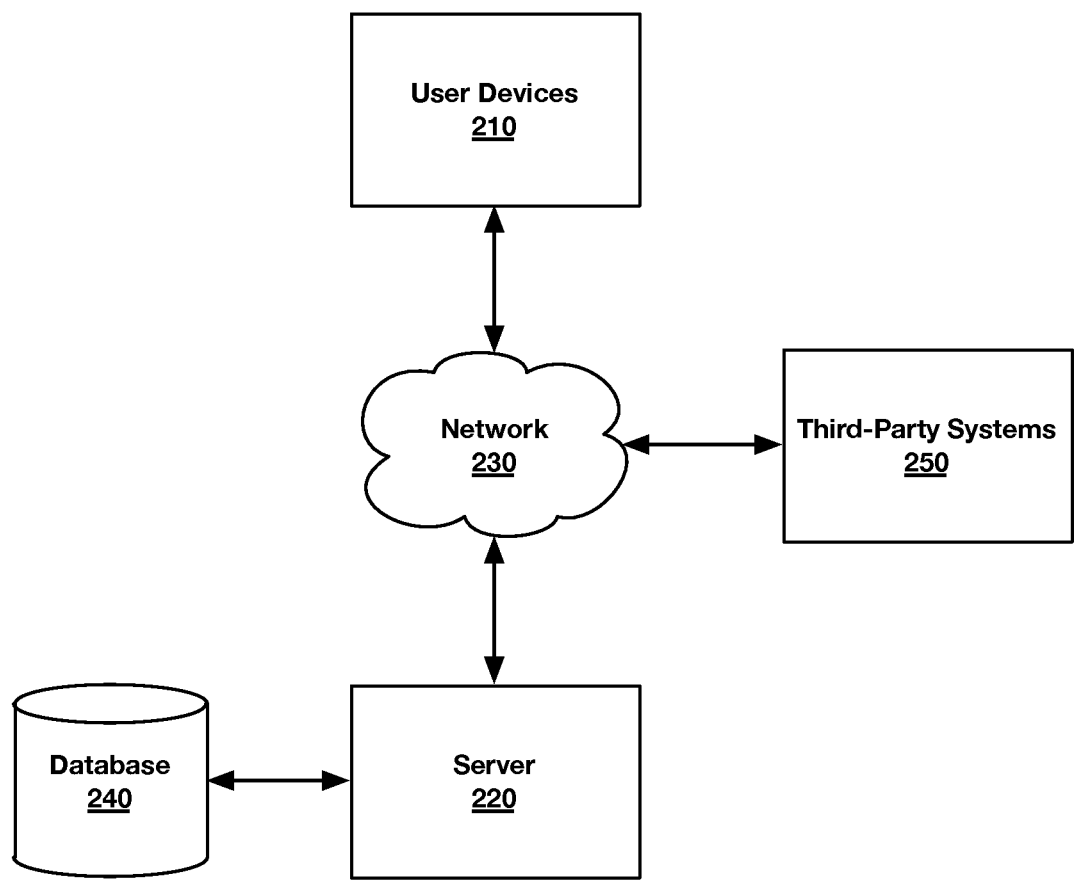
FIG. 2 shows an exemplary information disclosure system 200 according to an embodiment.

Referring to FIG. 2, a block diagram of an exemplary system according to an embodiment is illustrated. As shown, the system comprises any number of users accessing a server 220 via a network 230. In certain embodiments, a user may access the server 220 via a client device 210 connected to the network 230 (e.g. Internet, LAN, cellular, intranet, etc.).

Generally, a client device 210 may be any device capable of running an information disclosure application and/or of accessing the server (e.g., via the information disclosure application or via a web browser). Exemplary client devices may include general purpose desktop computers, laptop computers, smartphones, and/or tablets. Preferred client devices include those with touch screens to allow users to view, select and manipulate various items displayed by the information disclosure application (also referred to as a "client application").

Each of the client devices 210 may have a client application running thereon, where the client application may be adapted to communicate with a server application running on a server 220 over, for example, a network 230. Such a configuration may allow users of client applications to input information and/or interact with the server from any location.

As discussed in detail below, an information disclosure application may be adapted to present various user interfaces to users. Such user interfaces may be based on information stored on the client device and/or received from the server. Accordingly, each application may comprise HTML data, images, videos, icons, and/or executable code. The executable code may be composed in JavaScript, ECMAScript, coffeescript, python, Ruby or any other programming languages suitable for execution within the information disclosure application or for translation into an executable form.

In certain embodiments, the server 220 and/or the client device 210 may be adapted to receive, determine, record and/or transmit application information. The application information may be received from and/or transmitted to the information disclosure application or server application. Moreover, any of such application information may be stored in and/or retrieved from one or more local or remote databases (e.g., database 240).

Exemplary application information to be stored in and/or retrieved from one or more local or remote databases may include user disclosure information, private user information, and public user information (discussed above). The database 240 may further store user notification information, disclosure data requests, disclosure list categories, etc.

In one embodiment, the server 220 may be connected to one or more third-party systems 250 via the network 230. Third-party systems 250 may also store information in databases (e.g. database 140) that may be accessed by the server. Third-party systems may include, but are not limited to: payment and billing systems, social media and messaging systems, storage and sharing systems (i.e. for video, audio, photos, etc.), address book systems, calendar systems, and/or cloud-based storage and backup systems. The server 220 may be capable of retrieving and/or storing information from third-party systems 250, with or without user interaction. Moreover, the server may be capable of transmitting stored information to third-party systems.

Figure 3:
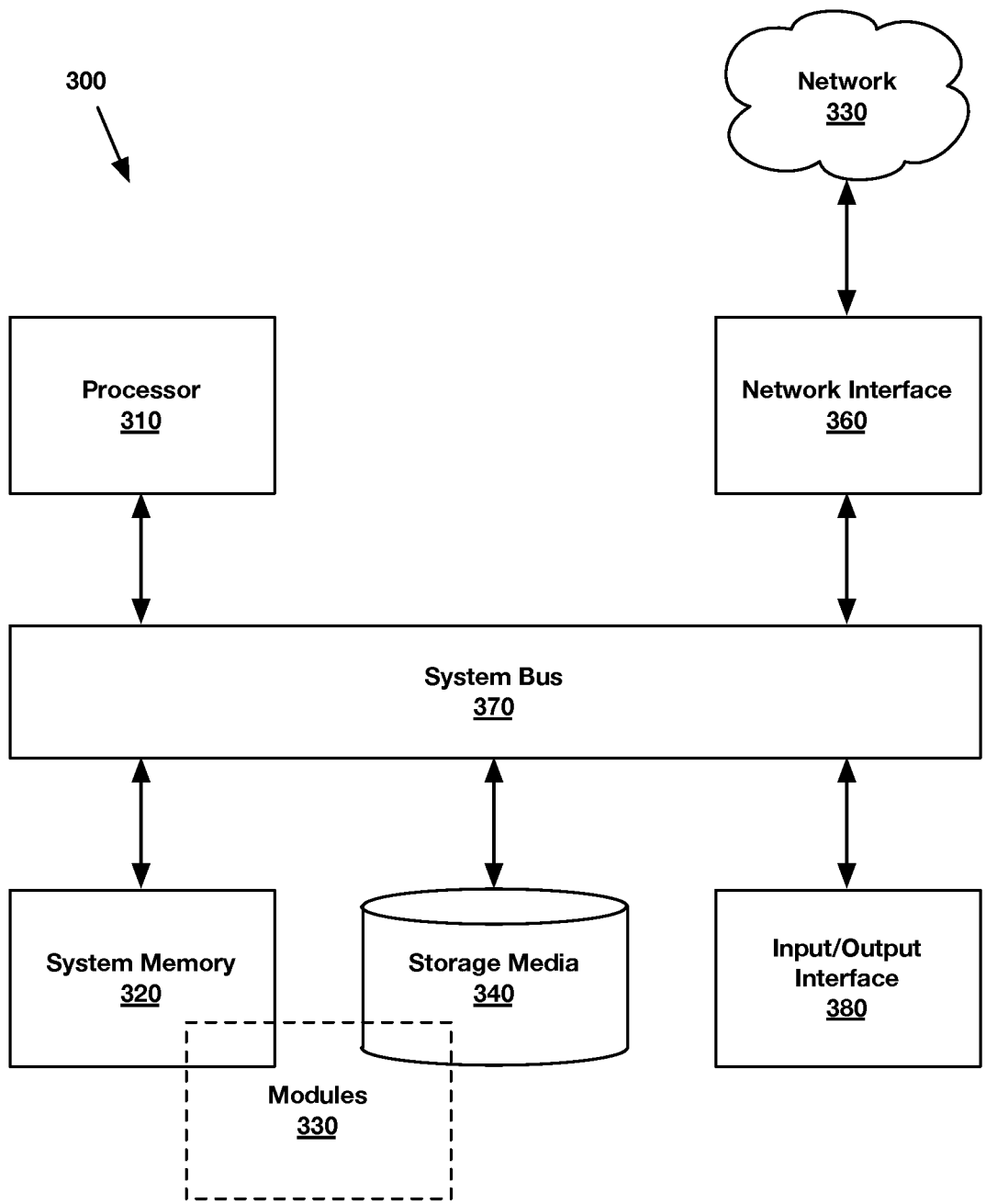
FIG. 3 shows an exemplary computing machine 300 comprising modules 330 according to an embodiment.

Referring to FIG. 3, a block diagram is provided illustrating a computing machine 300 and modules 330 in accordance with one or more embodiments presented herein. The computing machine 300 may correspond to any of the various computers, servers, mobile devices, embedded systems, or computing systems presented herein. The modules 330 may comprise one or more hardware or software elements configured to facilitate the computing machine 300 in performing the various methods and processing functions presented herein.

As shown, the computing machine 300 may include various internal and/or attached components such as processor 310, system bus 370, system memory 320, storage media 340, input/output interface 380, and network interface 360 for communicating with a network 350. The computing machine 300 may be implemented as a conventional computer system, an embedded controller, a laptop, a server, a mobile device, a smartphone, a set-top box, over-the-top content TV ("OTT TV"), Internet Protocol television ("IPTV"), a kiosk, a vehicular information system, one more processors associated with a television, a customized machine, any other hardware platform and/or combinations thereof. And, in some embodiments, the computing machine 300 may be a distributed system configured to function using multiple computing machines interconnected via a data network or bus system 370.

The processor 310 may be configured to execute code or instructions to perform the operations and functionality described herein, manage request flow and address mappings, and to perform calculations and generate commands. The processor 310 may be configured to monitor and control the operation of the components in the computing machine 300. The processor 310 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination/multiplicity thereof. The processor 310 may be a single processing unit, multiple processing units, a single processing core, multiple processing cores, special purpose processing cores, coprocessors, or any combination thereof. According to certain embodiments, the processor and/or other components of the computing machine may be a virtualized computing machine executing within one or more other computing machines.

The system memory 320 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 320 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 320 may be implemented using a single memory module or multiple memory modules. While the system memory is depicted as being part of the computing machine 300, one skilled in the art will recognize that the system memory may be separate from the computing machine without departing from the scope of the subject technology. It should also be appreciated that the system memory may include, or operate in conjunction with, a non-volatile storage device such as the storage media 340.

The storage media 340 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 340 may store one or more operating systems, application programs and program modules such as module, data, or any other information. The storage media may be part of, or connected to, the computing machine 300. The storage media may also be part of one or more other computing machines that are in communication with the computing machine such as servers, database servers, cloud storage, network attached storage, and so forth.

The modules 330 may comprise one or more hardware or software elements configured to facilitate the computing machine 300 with performing the various methods and processing functions presented herein. The modules 330 may include one or more sequences of instructions stored as software or firmware in association with the system memory 320, the storage media 340, or both. The storage media 340 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine via the network, any signal-bearing medium, or any other communication or delivery technology. The modules 330 may also comprise hardware circuits or information for configuring hardware circuits such as microcode or configuration information for an FPGA or other PLD.

The input/output ("I/O") interface 380 may be configured to couple to one or more external devices, to receive data from the one or more external devices, and to send data to the one or more external devices. Such external devices along with the various internal devices may also be known as peripheral devices. The I/O interface 380 may include both electrical and physical connections for operably coupling the various peripheral devices to the computing machine 300 or the processor 310. The I/O interface 380 may be configured to communicate data, addresses, and control signals between the peripheral devices, the computing machine, or the processor. The I/O interface 380 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 370. The I/O interface 380 may include one or more buffers for buffering transmissions between one or more external devices, internal devices, the computing machine 300, or the processor 310.

The I/O interface 380 may couple the computing machine 300 to various input devices including mice, touch-screens, scanners, biometric readers, electronic digitizers, sensors, receivers, touchpads, trackballs, cameras, microphones, keyboards, any other pointing devices, or any combinations thereof. The I/O interface 380 may couple the computing machine 300 to various output devices including video displays, speakers, printers, projectors, tactile feedback devices, automation control, robotic components, actuators, motors, fans, solenoids, valves, pumps, transmitters, signal emitters, lights, and so forth.

The computing machine 300 may operate in a networked environment using logical connections through the network interface 360 to one or more other systems or computing machines 300 across the network 350. The network 350 may include wide area networks ("WAN"), local area networks ("LAN"), intranets, the Internet, wireless access networks, wired networks, mobile networks, telephone networks, optical networks, or combinations thereof. The network 350 may be packet switched, circuit switched, of any topology, and may use any communication protocol. Communication links within the network 350 may involve various digital or an analog communication media such as fiber optic cables, free-space optics, waveguides, electrical conductors, wireless links, antennas, radio-frequency communications, and so forth.

The processor 310 may be connected to the other elements of the computing machine 300 or the various peripherals discussed herein through the system bus 370. It should be appreciated that the system bus 370 may be within the processor, outside the processor, or both. According to some embodiments, any of the processor 310, the other elements of the computing machine 300, or the various peripherals discussed herein may be integrated into a single device such as a system on chip ("SOC"), system on package ("SOP"), or ASIC device.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein, and the corresponding drawings, are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method comprising:
   receiving, by a server, user information associated with a first user, the user information comprising first, second, and third user information;
   receiving, by the server, from the first user:
      an activity-based disclosure condition associated with the first user information;
      a user-information-based disclosure condition associated with the second user information; and
      a point-based disclosure condition associated with the third user information;
   receiving, by the server, personal information associated with a second user, the personal information comprising first personal information and second personal information;
   receiving, by the server, from the second user, a time-based disclosure condition associated with the first and second personal information;
   tracking, by the server, a first user interaction performed by the first user,
      wherein the first user interaction relates to the second user;
   determining, by the server, that the activity-based disclosure condition associated with the first user information has been fulfilled, based on the tracked first user interaction;
   upon said determining that the activity-based disclosure condition has been fulfilled, automatically transmitting, by the server, only the first user information to the second user;
   comparing, by the server, the second user information associated with the first user to the personal information associated with the second user;
   determining, by the server, that the user-information-based disclosure condition has been fulfilled, based on said comparing the second user information associated with the first user and the personal information associated with the second user;
   upon said determining that the user-information-based disclosure condition has been fulfilled, automatically transmitting, by the server, only the second user information associated with the first user to the second user;
   transmitting, by the server, at a first time, the first personal information associated with the second user to the first user;
   automatically transmitting, by the server, at a second time that is after the first time, only the second personal information associated with the second user to the first user, based on the time-based disclosure condition,
wherein the server does not automatically transmit the second personal information to the first user before the second time, based on the time-based disclosure condition;
determining, by the server, a total point value based on a first point value associated with the disclosed first personal information and a second point value associated with the disclosed second personal information;
determining, by the server, that the point-based disclosure condition associated with the third user information has been fulfilled, based on a comparison of the total point value to a required minimum point value; and
upon said determining that the point-based disclosure condition has been fulfilled, automatically transmitting, by the server, only the third user information associated with the first user to the second user.

2. A method according to claim 1 further comprising notifying, by the server, the first user that the first user information and the second user information have been transmitted to the second user.

3. A method according to claim 1, wherein the first user interaction comprises one or more of the group consisting of: following the second user, joining a network to which the second user belongs, disclosing information to the second user, receiving information from the second user, sending a communication to the second user, receiving a communication from the second user, participating in an activity with the second user, traveling to a location that is within a predetermined distance from where the second user is located, visiting a web site that the second user has visited, selling a product to the second user and buying a product from the second user.

4. A method according to claim 1, wherein the second user information comprises one or more of the group consisting of: a username, a name, an age, a school attended, a degree obtained, a skill, a hobby, a habit, a birthplace, a current residence, a previous residence, a current location, a historical location, an employer, a family member, a strength, a weakness, a goal, a content preference, and medical information.

5. A method according to claim 1, further comprising:
displaying an information disclosure interface to the first user and the second user,
wherein the first user information and the second user information are displayed to the second user via the information disclosure interface.

6. A method according to claim 5, wherein:
the information disclosure interface comprises an avatar associated with the first user;
the first user information comprises a first feature associated with the avatar; and
the second user information comprises a second feature associated with the avatar.

7. A method according to claim 6, wherein the first and second features associated with the avatar are each selected from the group consisting of: height, weight, hair, voice, eyes, nose, chin, jaw, lips, eyebrows, forehead, cheekbones, and limbs.

8. A method according to claim 7, wherein the first and second features comprise digital representations of the respective physical features of the first user.

9. A method according to claim 5, wherein the personal information associated with the second user is transmitted to the first user via the information disclosure interface.

* * * * *